No. 844,993. PATENTED FEB. 19, 1907.
J. H. BALDWIN.
NUT LOCK.
APPLICATION FILED JUNE 6, 1905. RENEWED AUG. 15, 1906.
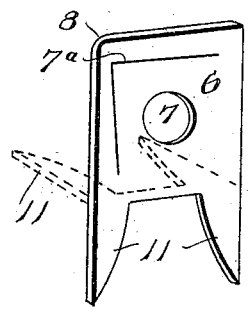
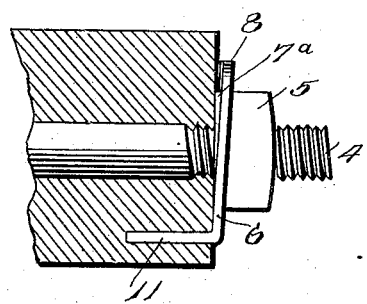
Witnesses
Frank Hough
H. H. Byrne
Inventor
J. H. Baldwin.
By Victor J. Evans
Attorney

UNITED STATES PATENT OFFICE.

JOHN H. BALDWIN, OF BEAUMONT, TEXAS.

NUT-LOCK.

No. 844,993.     Specification of Letters Patent.     Patented Feb. 19, 1907.

Application filed June 6, 1905. Renewed August 15, 1906. Serial No. 330,739.

*To all whom it may concern:*

Be it known that I, JOHN H. BALDWIN, a citizen of the United States, residing at Beaumont, in the county of Jefferson and State of Texas, have invented new and useful Improvements in Nut-Locks, of which the following is a specification.

My invention relates to nut-locks; and its primary object is to provide a novel and highly useful device of this character which, although especially adapted for securing against accidental displacement a nut upon a bolt used in connection with rail-joints, is also equally well adapted to lock a nut upon a bolt used in connection with any other construction.

The invention consists in the construction, combination, and arrangement of parts more fully hereinafter described, claimed, and illustrated in the accompanying drawings, which disclose the preferred form of my invention, and in which—

Figure 1 is a detail perspective view of my nut-lock; and Fig. 2 is a view in side elevation, illustrating the application of the nut-lock.

Referring to the drawings by reference-numerals, the nut-lock comprises a plate 6, struck up from any suitable material and provided with a central orifice 7, by means of which said plate may be mounted upon the bolt between the nut and the portion against which it is secured. The plate 6 is provided with two acute-annular incisions 7ª, providing said plate with a nut-engaging member 8, which when the plate is in applied position upon the bolt is adapted to be bent to bring the acute-angular edges thereof into engagement with two sides of the nut to secure the nut in applied position against accidental displacement.

As disclosed in Figs. 1 and 2, the invention resides in providing the plate 6 with prongs 11. These prongs are formed integral with the plate 6 and are adapted to be bent into horizontal position, as disclosed in the view shown. This provision of the plate 6 with the prongs 11 adapts the same for application to constructions other than that of rail-joints—as, for instance, where the bolt is used in connection with wooden constructions the prongs 11 are adapted to be driven therein, and thus hold the plate in a position upon the bolt against turning.

After the plate has been inserted upon the bolt between the nut and the member through which the bolt projects a tool is inserted behind the curved corner of the nut-engaging member 8 and the same is bent so as to bring its acute-angular edges into engagement with two sides of the nut, as illustrated in Fig. 2 of the drawings.

Having thus fully described the invention, what is claimed as new is—

In a nut-lock, the combination of a rectangular plate slitted to provide an acute-angular member in its upper portion, and cut away in its lower portion to provide two pointed members, said pointed members adapted to be bent at right angles to the plate and serve as securing means thereto.

In testimony whereof I affix my signature in presence of two witnesses.

JOHN H. BALDWIN.

Witnesses:
    G. R. HALDER,
    R. A. MCREYNOLDS.